(12) United States Patent
Peters et al.

(10) Patent No.: US 8,809,739 B2
(45) Date of Patent: Aug. 19, 2014

(54) WELDER WITH POSITIONAL HEAT CONTROL AND METHOD OF USING SAME

(75) Inventors: Steven R. Peters, Huntsburg, OH (US); Bruce E. Fulmer, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 13/456,987

(22) Filed: Apr. 26, 2012

(65) Prior Publication Data

US 2013/0175247 A1    Jul. 11, 2013

Related U.S. Application Data

(63) Continuation of application No. 11/468,037, filed on Aug. 29, 2006, now abandoned.

(51) Int. Cl.
*B23K 9/12* (2006.01)
(52) U.S. Cl.
USPC ............... 219/137 PS; 219/130.1; 219/130.5; 219/125.12
(58) Field of Classification Search
CPC ................................ B23K 9/09; B23K 9/0216
USPC ................. 219/121.12, 130.5, 130.1, 125.15, 219/137 PS
See application file for complete search history.

(56) References Cited

U.S. PATENT DOCUMENTS

| | | | |
|---|---|---|---|
| 1,956,406 A | 4/1934 | Vars | |
| 4,270,037 A | 5/1981 | Grinin et al. | |
| 5,278,390 A | 1/1994 | Blankenship | |
| 6,274,845 B1 | 8/2001 | Stava et al. | |
| 6,498,321 B1 | 12/2002 | Fulmer et al. | |
| 6,501,049 B2 | 12/2002 | Stava | |
| 6,717,107 B1 | 4/2004 | Hsu | |
| 6,717,108 B2 | 4/2004 | Hsu | |
| 6,734,394 B2 | 5/2004 | Hsu | |
| 6,847,008 B2 | 1/2005 | Myers et al. | |
| 7,067,767 B2 | 6/2006 | Hsu | |
| 2005/0242075 A1 | 11/2005 | Kuiper et al. | |

FOREIGN PATENT DOCUMENTS

JP        59141377        8/1984

OTHER PUBLICATIONS

International Search Report, International Application No. PCT/US07/64183.

*Primary Examiner* — Mark Paschall
(74) *Attorney, Agent, or Firm* — Hahn Loeser & Parks LLP

(57) ABSTRACT

An electric arc welder for producing a weave pattern across a workpiece with a succession of individual weld short runs or bead, each of which has a center portion extending between two transversely spaced edges. The welder comprising a power source, a wire feeder to direct a welding wire through a movable torch to the workpiece and a controller for creating a welding current between the wire and the workpiece. A mechanical device is used to move the torch along the bead and the controller has a program to perform a first weld process while the torch is moving along the center portion and a second weld process when the torch is adjacent the edges, where the first weld process has less heat input than the second weld process.

21 Claims, 11 Drawing Sheets

WELDER WITH POSITIONAL HEAT CONTROL AND METHOD OF USING SAME

CROSS REFERENCED TO RELATED APPLICATION

This application is a continuation of and claims priority to U.S. patent application Ser. No. 11/468,037, filed on Aug. 29, 2006, which is incorporated herein by reference.

FIELD OF THE INVENTION

The present invention relates to the art of electric arc welding and more particularly to a novel welder for heat control of a welding operation and the method of using the novel welder to produce a weave pattern using positional heat control.

BACKGROUND

Electric arc welding is used in a wide variety of metal jointing and surfacing applications. In most welding applications, the electrode is manipulated with respect to the welded joint, in order to achieve a desired weld bead profile. One form of electrode manipulation is weaving the electrode side to side across the weld joint serving to manipulate the heat of the arc and spread out the weld bead. In some of welding applications, this weaving motion is delayed at one or both edges of the weld. In practice, this delay is called a dwell. A weave technique is implemented in practice by many methods. Semi-automatically, the welder manipulates the torch back and forth across the weld joint while moving the torch along the weld joint. Many levels of mechanization are also commercially available. These machines mechanically weave the welding torch back and forth while also moving the electrode along the weld joint. Most welding robots offer several weave patterns as a standard feature. A weave technique is commonly used in a host of various joining and surfacing applications. The specific weave technique used as well as the specific effect obtained from the weave will depend on the application. Examples include open root butt joints where the electrode is weaved across the open joint and held on either side to achieve good penetration into the two workpieces to be joined without burning through the joint. When welding out-of-position fillet joints, the weave is used to focus the heat of the arc away from the center of the weld to obtain a relatively flat bead shape. In overlay and hardfacing applications, a weave is used to deposit weld metal across a large surface with minimal admixture from the base metal. In all of these examples, a weave technique was used to manipulate the heat of the arc away from the center of the weld joint and toward the edges of the weld. But the effect of using a weave technique is limited by how much of this heat can be manipulated by movement along. Thus there is a need for an improved welding system and method that further differentiates the heat input between the edges of a weave technique and the center.

SUMMARY

In accordance with the present invention, there is provided an electric arc welder to perform a method that manipulates the heat of arc welding in coordination with a weave technique of the welding electrode across the weld zone. Across the center of the weave, a low heat procedure is maintained. At either side of the weave, a higher heat procedure is maintained. The low heat procedure reduces penetration and reduces admixture of the base metal into the weld metal. This is advantageous in many applications but specifically in hard-facing applications, a thinner weld bead can be applied that maintains more alloy content in the outer wear edge of the weld bead. The high heat procedure at the edges of the weave help tie the weld into a previous weld bead and help avoid lack of penetration at the edge of the weld bead. The invention finds particular utility in association with semi-automatic welding operations in which the transition between high heat and low heat procedures is based on time, where a welding operator gauges the weaving motion based on the machine's transitions from the two procedures. The operator transfers across the center of the weld during the low heat procedures and holds the edge of the weave during the high heat procedure. In one embodiment, the operator detects the switch from one procedure to the next based on audibly discernable differences in the sounds of the welding system during the different procedures. In another possible embodiment, the system provides an audible signal upon procedure switchover, and the operator adjusts the movement of the welding torch accordingly. In on e embodiment, the low heat procedure may be a shorting type transfer to further reduce the heat input. The high heat procedure may be a pulsed spray type transfer in further increase the heat input at the edges of the weld. The difference in the sound of the shorting type transfer and the pulsed spray transfer further assists the operator to coordinate the movement of the electrode to the change in procedure.

Other applications for the invention include mechanized applications where the limits of the weave would signal the welding machine to change to the high heat procedure. The high heat procedure would be maintained for a defined time before the welding machine would revert back to the lower heat procedure.

In accordance with the present invention, there is provided an electric arc welder to perform a method that manipulates the welding heat while weaving the electrode or welding wire across a puddle in a weave pattern. In accordance with the invention, a medium heat weld process is used in the center of the weave and a significantly increased heat weld process is used at the transversely spaced edges of the weld bead. This unique approach combines a (low) heat process while the electric arc welding is operating across the center of the weld and a synchronized higher heat process at the edge of the weld bead. This method is used for semi-automatic welding or fully automatic welding. Several implementations of the novel method are possible. The invention is also an electric arc welder for performing the novel method with novel controller functions. The welder and method are specifically used for overlaying work with nickel alloys, but is also applicable for other applications, in theory, the invention includes any welding where a weave technique is employed and the heat input is manipulated from a low heat in the center of the bead to a high heat at the transversely spaced edges of the bead.

In accordance with the invention a side to side weave welding technique is employed, together with a synchronization element or device, to change the waveform the opposite ends of a bead in the weave pattern. At the edges of the weld bead, the output of the electric arc welder is switched to one welding process and across the face of the weld the electric arc welder is switched to another weld process. In most applications the weld process employed at the edge of the weave consists of a high heat process using a spray transfer process, a pulse transfer weld process or a high neat mode. Across the face of the weld bead, the heat is reduced using a shorting type transfer, a low heat pulse spray transfer or a low heat mode. The invention is particularly applicable for surfacing of a plate and for root welding of two plates or a pipe joint.

As the welder progresses along the successive runs defining the weave pattern, a "flag" from the digitally programmed controller signals when there is a desired shift from one weld process to the other. There are several techniques for creating the "flag." In one technique, the flag is created when a timer reaches a desired value. The defined time is adjustable by the user. Another technique involves a flag created when a counter reaches a set value. The counter will increment based upon an event, such as the number of pulse cycles. The defined count value is adjustable by the user, as is the timer technique. Another embodiment involves a flag created by the digital input from another device, such as a proximity switch, limit switch or a remote controller. The flag may be an actual digital signal or an inverse digital signal depending upon the logic required for the program of the controller used by the power source. In another technique, a flag is created by the condition of the welding output, such as current, voltage or power. This flag can be created by an integral or other calculated function related to the output. In summary, the flag or indicia for changing from one welding process to another welding process employs one of several embodiments of the invention.

A unique aspect of the invention is implementation by using a software control machine with state tables in a memory module where a single state table includes two separate weld processes. The weld state table processes a pulse mode or a power mode dependent upon the condition of a flag logic at any given time. In accordance with another aspect of the invention, the weld process adjusts the wire feed speed at the center of the weld bead so that it is different than the wire feed speed at the transversely spaced edges. In accordance with another aspect of the invention, the polarity of the low heat weld process is selected to be different than the polarity of the high heat weld process. Using a variable polarity power source there are many variations of polarity that are used in conjunction with conventional methods to adjust the heat input at the center of the weld bead as compared to the heat input at the transversely spaced edges of the weld bead.

The invention involves an electric arc welder and method of operating such welder, which shifts from a high heat process at the transverse edges of a short weld bead to a low heat process in the center of the weld bead. The weld bead is a run of a weave pattern and has a length less than 2.0 inches. Various high heat processes can be used, such as spray transverse GMAW, pulse spray transfer, high power mode, high wire feed speed, positive polarity pulsing, and/or high duty cycle VP-GMAW to name the more common high heat weld processes. The low heat weld process can include such processes as short arc transfer GMAW, surface tension transfer, low power mode, low wire feed speed, negative polarity shortening transfer such as CV-GMAW, low duty cycle VP-GMAW and/or CMT transfer, to name the most prevalent low heat weld processes. Essentially the invention involves a low heat in the center of the weld run or bead and high heat adjacent the edges of the run or bead. The bead defines one pass of a weave pattern.

The novel welder involves a travel mechanism that moves the welding torch in the prescribed weave pattern. The particular type of travel mechanism determines the type of flag used to change from one weld process to another process at positions along the weld bead. For instance, when using an automatic welding apparatus the digital program of the controller used for generating the various waveforms will employ any one of the "flag" techniques defined above.

When using the invention for semi-automatic operation the operator coordinates the side-to-side movement of the torch with the set duration of each weld process. The operator sets the time of each weld process for the desired joint being welded. Switching of the weld process tells the operator to make a direction change or dwell. If this does not conform to the prescribed position the rate of movement is modified. There is a consistent weave weld with the proper synchronization of position and heat level. The low heat process dictates the travel speed across the joint. The high heat weld process will dictate the dwell time at each edge of the weld bead. In most instances the weld processes have a different sound and each weld process has a set time or count as it moves along the bead. At the end of that time or count, the high heat weld process is automatically initiated. This creates a different sound for the operator. The operator controls the rate of movement during the low heat weld process so the change of sound occurs at each edge of the weld bead. This defines the use of the present invention in a semi-automatic operation.

The invention was particularly developed for overlay welding where minimal admixture between the base metal and the weld metal is desirable. In this application, the beads are woven side-by-side. Extra penetration is required at the ends of the weld bead to achieve penetration into the base metal so that the weld bead does not spill off. The bead must penetrate the previously created bead to eliminate a void between the passes. A pulse transfer weld process is used at the edges of the weld to increase the heat and achieve the necessary penetration. Across the face of the weld, the general power mode of the welder is set to the necessary power level to obtain short arc transfer in the center of the bead. This low power process reduces the heat and admixture into the base material in the center of the weld bead.

The invention is also applicable for open root butt joints to join plates or pipe sections. in this application of the invention, a variable polarity option is beneficial to further reduce the heat input across the unsupported "open" gap of the joint. A surface tension transfer or short arc operated in negative polarity is a process that is extremely stable and creates very low heat input. This process is quite beneficial in the open gap of the joint. At the edges of the joint, the polarity is reversed and a pulse transfer process or other high heat transfer process is employed. This results in good penetration into the base metal at the opposite sides of the open joint. Thus, the center portion of the weld bead is performed at a negative polarity and the edge portions of the weld bead are formed at a positive polarity. The different polarities are constituents of the high and low heat weld processes.

In heavier vertical up fillet welds on plates, it is sometimes desirable to use a weave pattern. When this is done, the invention is applicable to reduce the heat applied across the face of the weld and still achieve good penetration at the "toes" of the weld where high heat welding is performed.

In accordance with the present invention, there is provided an electric arc welder for producing a weave pattern across a workpiece with a succession of individual weld runs, each of which has a center portion extending between two transversely spaced edges. The novel welder comprises a power source, a wire feeder and a digital controller for causing the power source to perform a first weld process in the center portion of the bead and a second weld process adjacent at least one of the edges. In accordance with the preferred embodiment, the second weld process is performed adjacent both of the transversely spaced edges of the bead and the second weld process has a higher heat compared to the first weld process.

In accordance with another aspect of the present invention there is provided a method of producing a weave pattern across a workpiece with a succession of individual weld runs, each of which has a center portion extending between two transversely spaced edges. The method involves creating a weld current between a welding wire moving through a torch toward the workpiece, moving the torch along the weave pattern, performing a first weld process while the torch is moving across the center portion, performing a second weld process when the torch is adjacent the edges and causing the first weld process to have less heat input than the second weld process.

The primary object of the present invention is the provision of a novel electric arc welder and method of using the novel welder, which welder and method employ two weld processes coordinated with the movement and/or position of the welder over a workpiece. The method relates to a short weld bead, such as a bead less than about 2.0 inches and preferably less than 1.0 inches.

Still a further object of the present invention is the provision of a welder and method, as defined above, which welder and method coordinate the movement along the bead of a weave pattern with a high heat input process and a low heat input process. The low heat process is used across the face of the bead and a high heat process is used at the edges of the bead.

Another object of the present invention is the provision of a welder and method as defined above, which welder and method employs a timing arrangement for changing between the two weld processes. When the welding procedure is semi-automatic, a different sound signals the user to change the direction and/or dwell of the welder to coordinate a position with the two separate weld processes.

Yet another object of the present invention is the provision of a welder and method, as defined above, which welder and method employs an AC or variable polarity system wherein the polarity is dependent upon the position of the electrode as it weaves back and forth along successive weld beads.

A further object of the present invention is the provision of a welder and method, as defined above, which welder and method is used in a variety of welding applications where a weave pattern is employed and where a different heat between the center of the bead and the edges of the bead is beneficial.

These and other objects and advantages will become apparent from the following description taken together with the accompanying drawings.

PREFERRED EMBODIMENT

Figure 1:
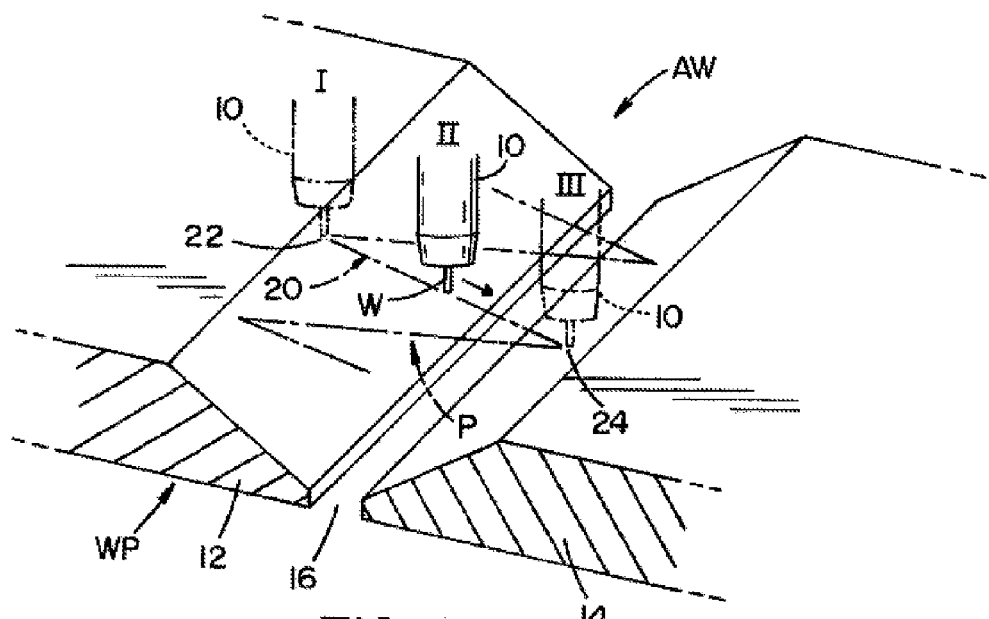
FIG. 1 is a pictorial view illustrating the present invention used for an open root joint.
Figure 1A:
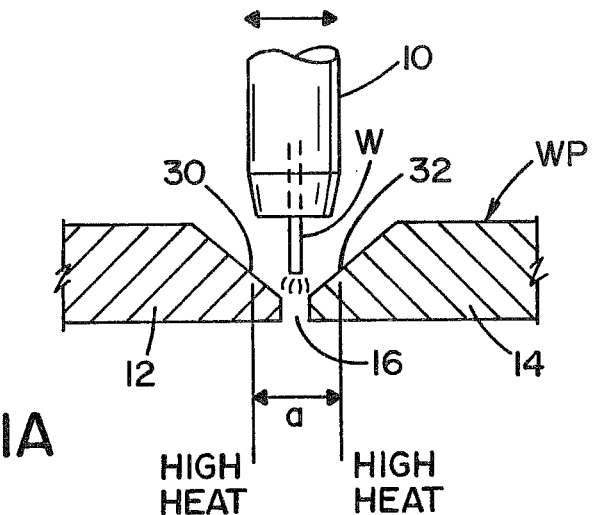
FIG. 1A is an enlarged partial cross-sectional view of the root welding operation shown in FIG. 1.
Figure 1B:
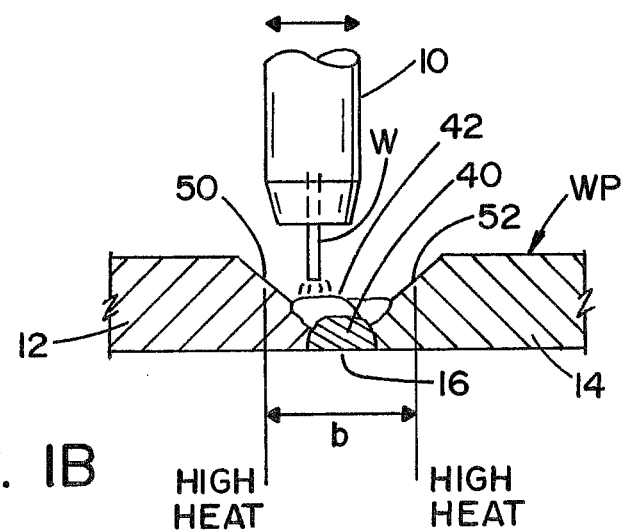
FIG. 1B is a cross-sectional view similar to FIG. 1A illustrating an additional fill pass utilizing the present invention.
Figure 1C:
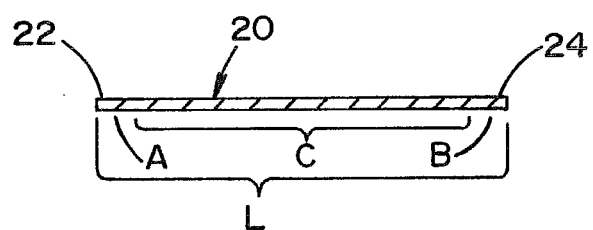
FIG. 1C is a cross-sectional view of a single run or bead in a weave pattern illustrating the center portion and adjacent areas processed in accordance with the present invention.

Referring now to the drawings, wherein the showings are for the purpose of illustrating a preferred embodiment of the invention only and not for the purpose of limiting the same, FIGS. 1, 1A, 1B and 1C show torch 10 of a welder AW for directing wire W toward workpiece WP illustrated as two plates 12, 14 separated by an open root or gap 16. Workpiece WP can also be a flat surface of a plate to be hard surfaced or other similar workpieces. In accordance with the invention, welder AW moves torch 10 in a weave pattern P including run or bead 20 having transversely spaced edges 22, 24 and a center portion C, as best shown in FIG. 1C. Run or weld bead 20 has an oscillation distance L. Center portion C terminates in small areas A, B adjacent transversely spaced edges 22, 24, respectively. In accordance with the invention, electric arc welder AW is controlled to move torch 10 along bead or run 20 from one edge 22 in the adjacent area A (position I) and then along the bead in center portion C (position II) until the torch reaches area B adjacent transverse edge 24 (position III.) Thus, welder AW moves torch 10 along weave pattern P by laying a short elongated bead 20 between area A and area B by moving the torch along the center portion C of the weld bead.

Figure 6:
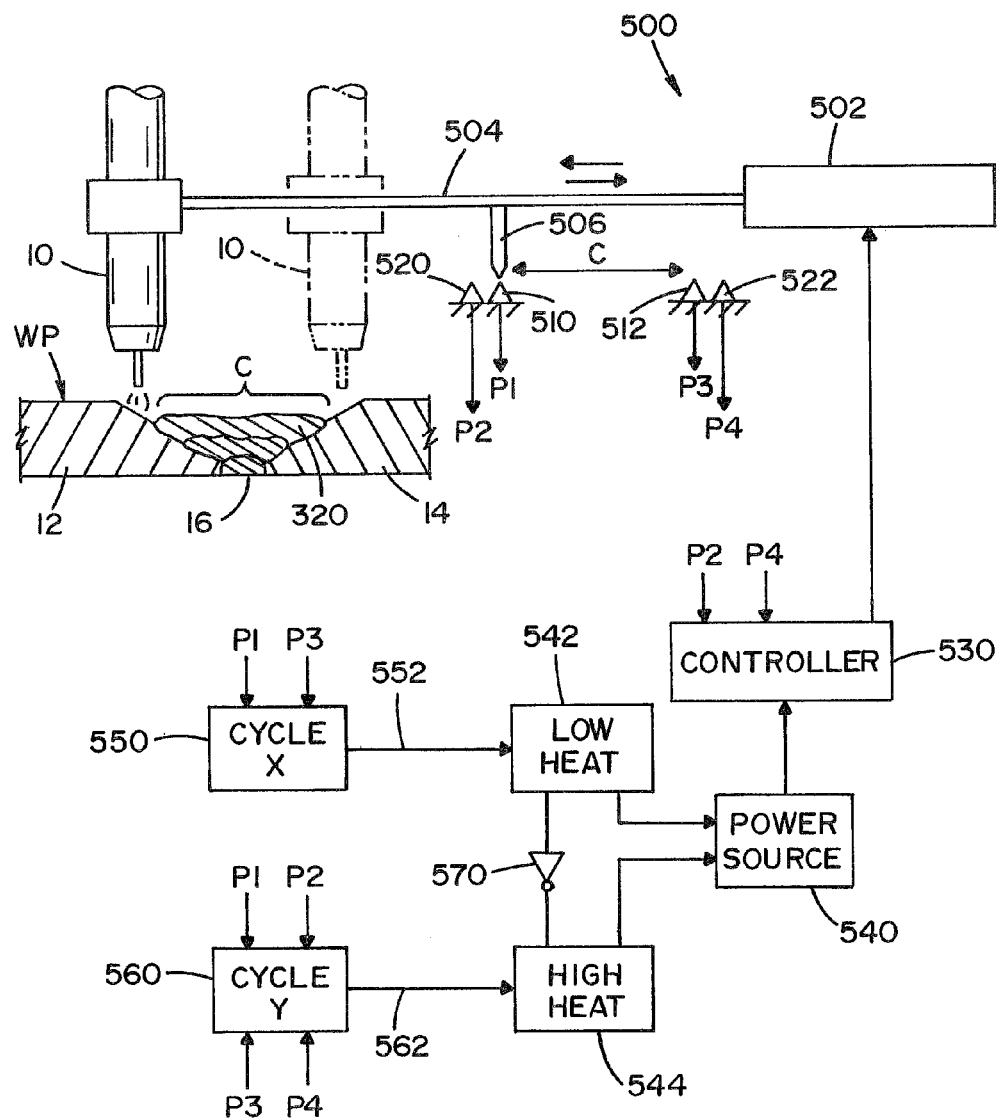
FIG. 6 is a combined flow chart and schematic side view of a moving mechanism for controlling a welder practicing the preferred embodiment of the present invention.

In accordance with the invention, welder AW moves torch 10 along weave path P by an appropriate mechanism, one of which is schematically illustrated in FIG. 6. The welder performs two weld processes, one of which is a high heat weld process performed by welder AW at areas A and B and the other is a low heat process performed by welder AW as it moves along the center portion C of run or bead 20. The welder shifts from a high heat weld process to a low heat weld process for welding along center portion C and then shifts back to a high heat welding process to finish the bead. This procedure is repeated along the various transverse runs or beads of pattern P to fill the gap between plates 12, 14. After the gap is filled, further metal may be deposited by a weave pattern across the first bead between plates 12, 14 by using the welder and method of the invention.

The invention involves the broad concept of using a low heat weld process in the center portion of bead 20 with high heat welding at areas A, B adjacent edges 22, 24, The movement of torch 10 is at a uniform rate through center portion C, but it may dwell for a short time at adjacent areas A, B to penetrate deeper into plates 12, 14. In this manner, the low heat over gap 16 does not cause molten metal to blow through the gap during the welding process. When the invention is used for an open root weld, the first pass or root pass is shown in FIG. 1A wherein the transversely spaced edges 30, 32 are subjected to high heat and the center portion C is subject to low heat. This process lays root bead 40 shown in FIG. 1B that is covered subsequently by an upper bead 42 deposited over root bead 40 by movement of torch 10 in a weave pattern between transversely spaced edges 50, 52. At these two edges, a high heat welding process is performed by welder AW. Between edges 50, 52 the center portion b is welded by a low heat process. The procedure of Fig. 1B is repeated so the metal fills the gap between plates 12, 14. The preferred low heat process in center portion C is performed as a surface tension transfer weld process. The high heat welding at areas A, B is preferably formed by spray transfer or pulse spray transfer. The various high temperature processes and low temperature processes are set forth in the introductory portion of this description and in the appended claims, both of which form a part of the present disclosure.

In summary, electric arc welder AW moves torch 10 in weave pattern P by movement along bead or run 20 from a first position adjacent one edge to a second position adjacent another edge by translation along center portion C. In accordance with the welder and method of operation of the present invention, center portion C is welded with low heat and adjacent areas A, B are welded with high heat. This basic aspect of the present invention is employed in various control implementations as will be hereinafter described.

Figure 7:
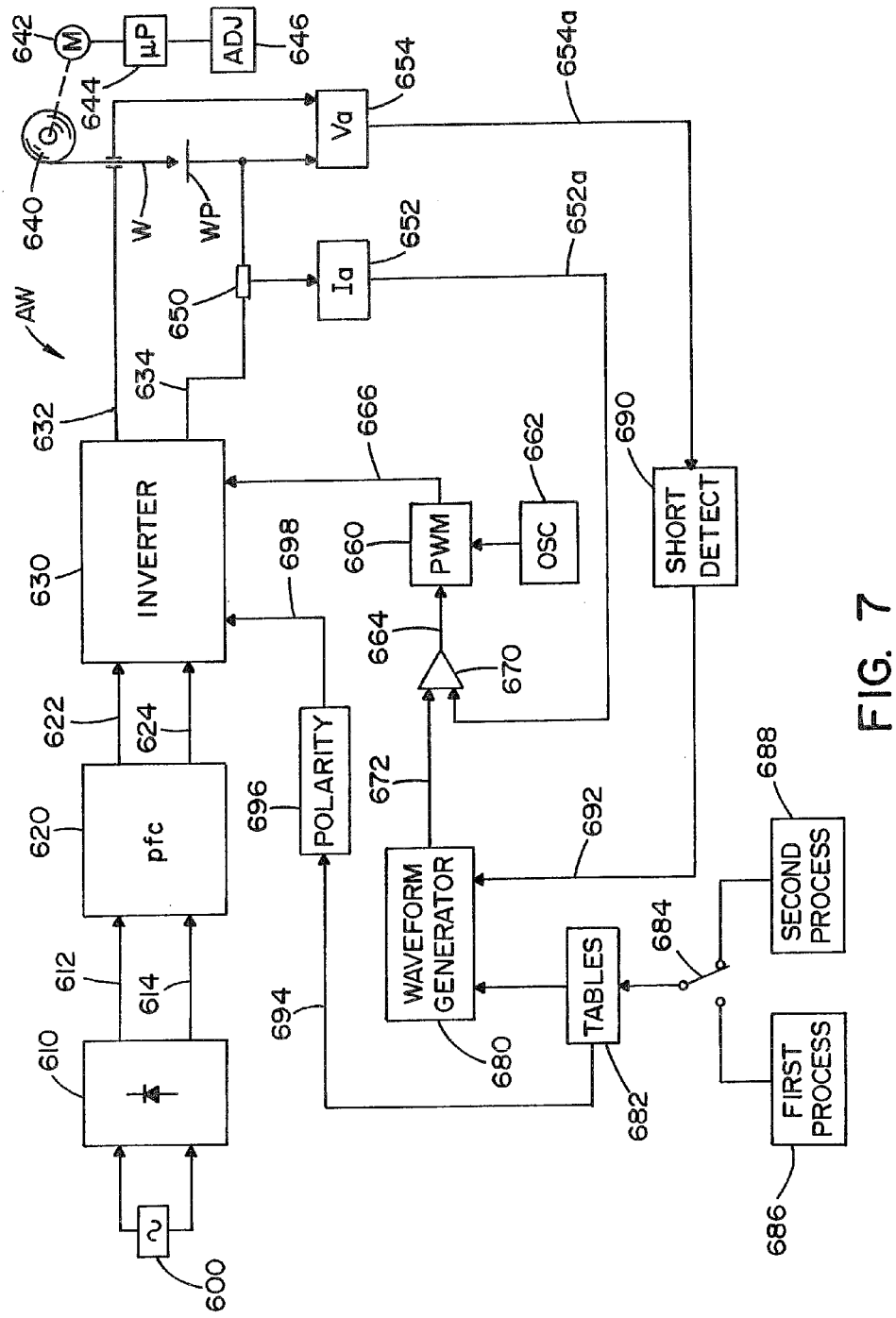
FIG. 7 is a block diagram of the preferred power source used in the welder and method of the present invention.

The broad aspect of the present invention involves an electric arc welder having a power source as shown in FIG. 7, a standard wire feeder and a controller which has an appropriate digital program to synchronize movement of torch 10 with different types of weld process. A broad aspect of the invention is illustrated as program 100 in FIG. 2. First low weld process 102 is performed along center portion C. A decision block, step circuit or routine 104 awaits the movement of torch 10 to either area A or area B. This decision routine is controlled by various elements, such as a proximity switch, a limit switch, a timer, a counter, or a program generated flag indicating that control program 100 is to be shifted from the first low heat weld process to a second high heat process. Thus, the decision step or routine 104 awaits an indication that torch 10 has been moved to area A or area B. Until that event, every interrogation of block 104 creates a logic signal on line 106 to cycle back to the first process control program 100. Upon creation of a flag indicating the movement of torch 10 to area A or area B or, in the alternative, an indication that it should be in area A or area B, step or routine 104 creates a logic signal on line 110 to discontinue the first process through gate 112 and initiate the second process by the logic on line 110. As long as torch 10 is in area A or area B, decision step or decision routine 122 creates a logic on line 124 that maintains operation of the second weld process. When the bar NB block 122 shifts logic on line 126 based upon movement away from or presumed movement away from areas A and B, the logic on line 126 returns welder AW to the first weld process and deactivates the second process through gate 128. In practice, program 100 is interrogated at a very high frequency, substantially greater than 100 kHz. Welder AW is at a low heat as torch 10 moves along center portion C and shifted to a high heat when the torch is in the general area of one of the transversely spaced edges. By an aspect of the invention, torch 10 dwells in areas A and B, thus continuing the second weld process during a dwell time for the purpose of increasing the penetration of bead 20 in the area of edges. FIGS. 1, 1A, 18, 1C and 2 describe the broad aspect of the electric arc welder AW and the method of operating the welder in accordance with the present invention.

Figure 2:
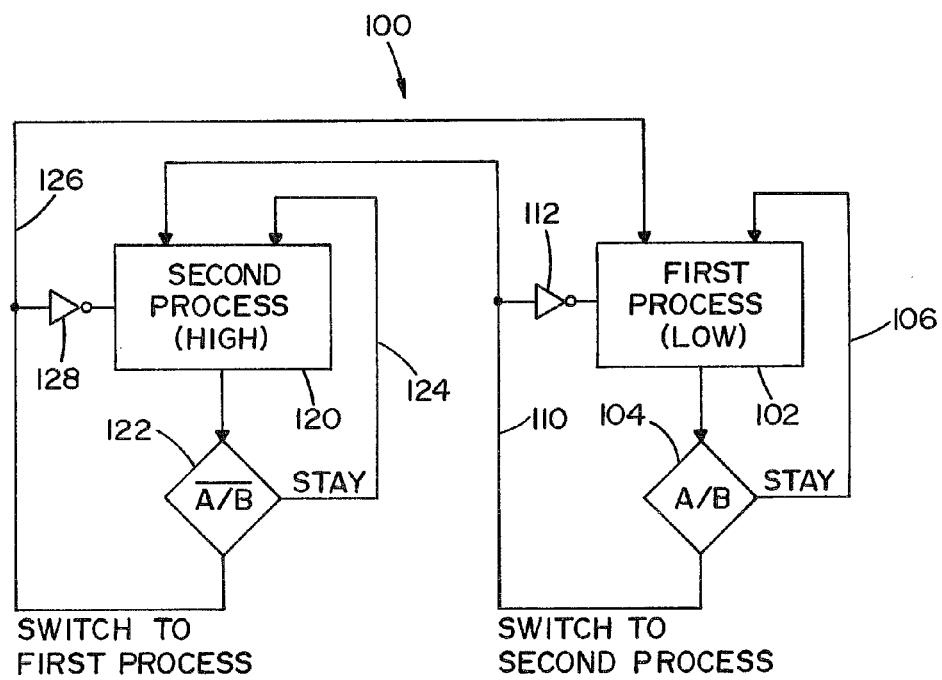
FIG. 2 is a block diagram and flow chart illustrating the controller program of a controller constituting the novelty of the electric arc welder forming an aspect of the present invention.
Figure 3:
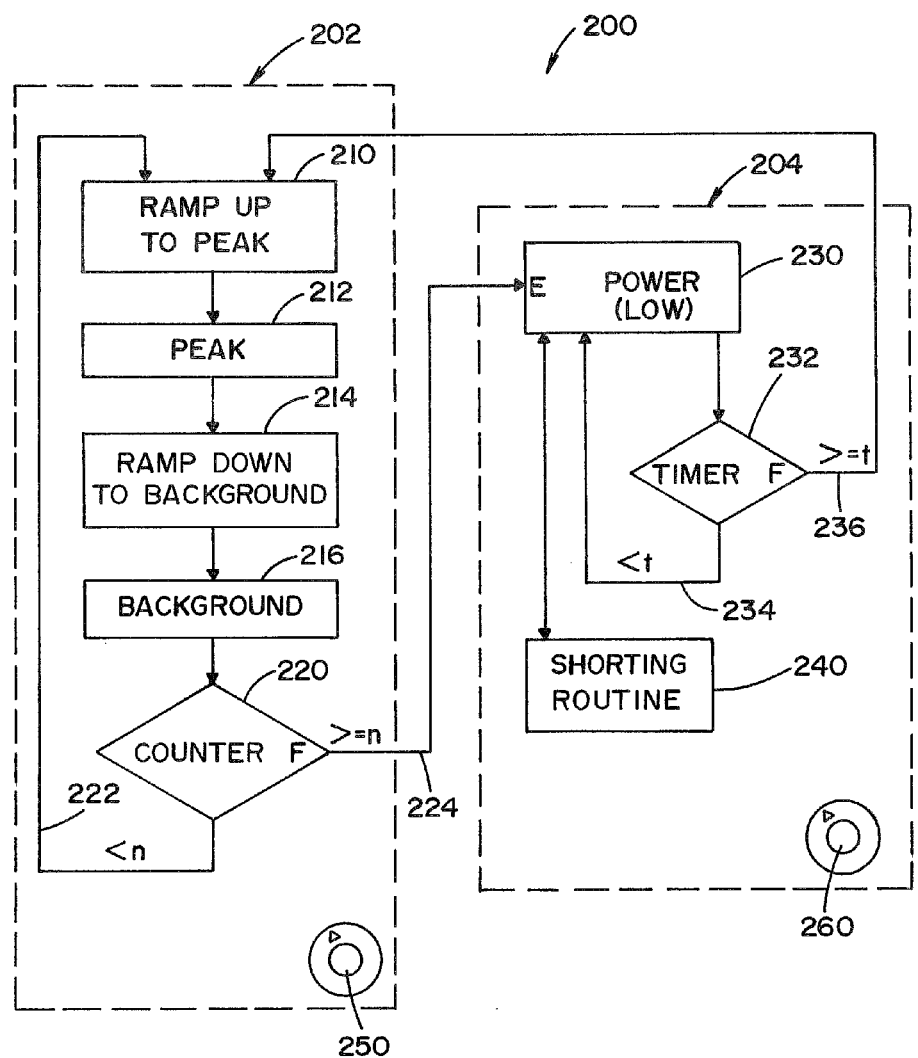
FIG. 3 is a block diagram and flow chart of the controller program used in a semi-automatic implementation of the present invention.

The invention disclosed in FIGS. 1 and 2 can be implemented by various applications. A semi-automatic implementation of the invention is illustrated in FIG. 3 wherein the controller program 200 includes two adjustable control procedures including section 202 for changing the process upon reaching a certain number of droplets transferred during the high heat pulse mode of electric arc welder AW and section 204 to control the time for the lower heat process, such as a short arc power mode. The controller of electric arc welder AW includes the program 200 for use in this semi-automatic application wherein the welder moves welding torch 10 in a weave path P over the surface of a workpiece or across the joint formed by two metal plates. By using this implementation of the invention, the low heat welding mode continues for a set time indicative of movement over the length of center portion C. Then, high heat is created by program section 202 at either of the spaced edges where the high heat weld process continues for a number of counts. These counts constitute the time necessary for dwelling in area A or area B and then reversing direction and moving back into center portion C. The operator moves the torch in pattern P and adjusts the time and count so that a uniform movement back and forth across the joint performs the invention by depositing molten metal at a low heat in center portion C and a high heat at the spaced edges.

In many instances, the operator is aware of the change in welding process and can adjust the counter or timer to correspond to length L of weld bead 20. Program 200 has a high heat section for pulse transfer areas A and B. The high heat is by a pulse transfer process. Such process is provided by use of a waveform generator to create a particular waveform having a ramp up portion 210. This step is held until the arc current reaches a peak level. The peak current is then maintained as indicated by blocks or step 212 for a set period of time by the waveform generator. Thereafter, the waveform ramps down as indicated by block or step 214. This lowers the current to a background level as indicated by block or program step 216. The created waveform including ramp up, peak, ramp down and background results in transfer of a droplet of molten metal from wire W onto workpiece WP, generally during the peak current indicated at step 212. Background current is held as indicated by step 216 for the purpose of melting the approaching wire to start a new droplet for the next transfer of a droplet during the peak portion of the next waveform. Thus, during each background portion of the waveform there is a droplet transfer. This event is counted by counter 220. If the count during the program interrogation cycle after each droplet is transferred does not equal set number n, a return signal or logic is created in line 222 which merely repeats the profile of the waveform created by the waveform generator. When the decision step or counter 220 reaches a certain number, a flag F is created to change the logic on output line 224. This enables the low power mode of the electric arc welder. The low heat process is block 230 at the start of section 204. This low power mode is maintained at a low heat level. Several welding processes deliver low heat input including GMAW-short arc, STT, CIVIT to name three examples. The time of the low heat process maintained over the center C of the weld 20, is predominate over the duration of the high heat process maintained over the edges A, B of the weld 20. Typically a timer is used to maintain the decision step 232 of the low heat process. If the timer is below the set time at a program interrogation, logic on line 234 merely maintains the low power level. When the timer reaches the set time, flag F is set. This flag changes the logic on line 236 causing the welder to shift from the low power or heat level of section 204 to the high heat process of section 202. In accordance with standard low heat short arc welding, a shortening routine 240 is incorporated in program section 204 for clearing any short circuit occurring during the low heat operation of the welder. Since this implementation of the invention is operator controlled, the operator can adjust the counter by knob 250 and the time by knob 260. These knobs are changed so that as pattern P is followed by a welder, the torch is moved in the center portion of the bead using the low power mode of section 204 and then dwells and reverses while the welder is converted into a high heat weld mode designated as section 202 of program 200. This flag changes the logic on line 236 causing the welder to shift from the low power or heat level of section 204 to the high heat process of section 202. In accordance with standard low heat short arc welding, a shortening routine 240 is incorporated in program section 204 for clearing any short circuit occurring during the low heat operation of the welder. Since this implementation of the invention is operator controlled, the operator can adjust the counter by knob 250 and the time by knob 260. These knobs are changed so that as pattern P is followed by a welder, the torch is moved in the center portion of the bead using the low power mode of section 204 and then dwells and reverses while the welder is converted into a high heat weld mode designated as section 202 of program 200.

Figure 4:
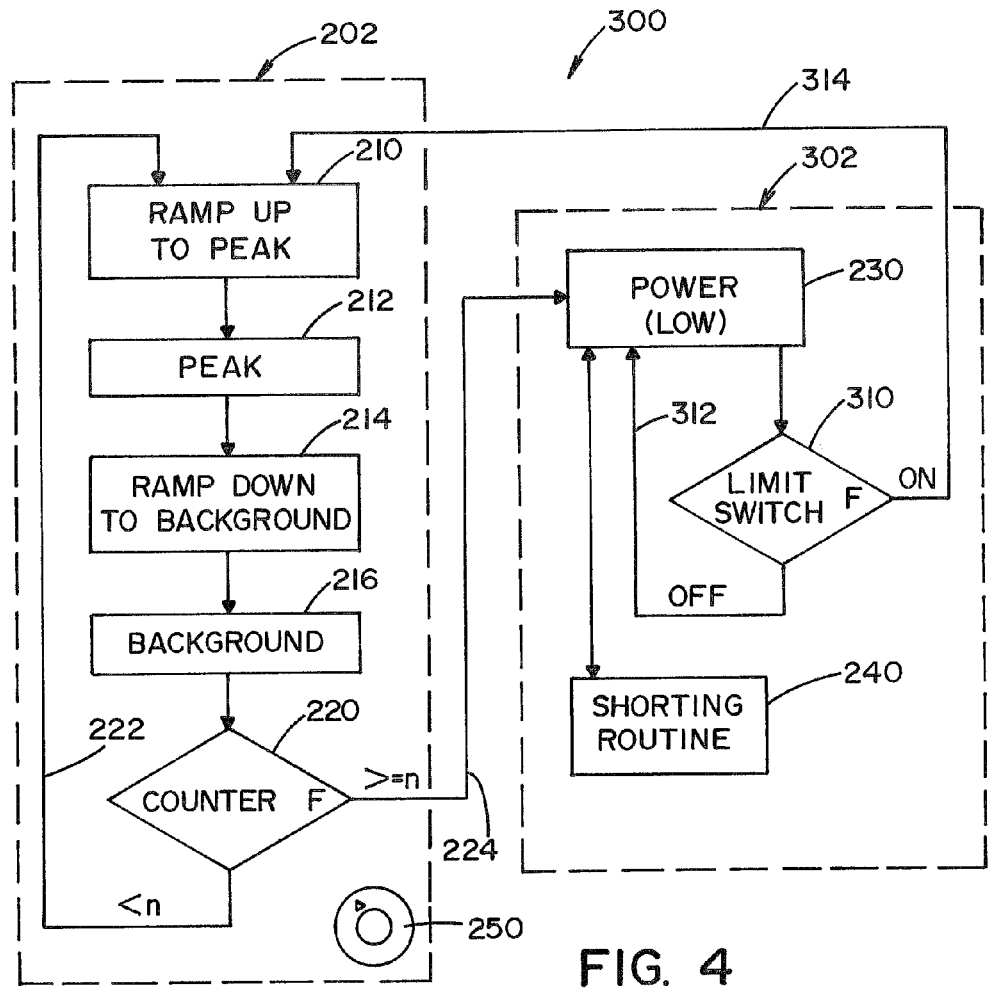
FIG. 4 is a block diagram and flow chart of the controller program used in a welder employing limit switches or proximity switches to provide a mechanized implementation of the present invention.
Figure 4A:
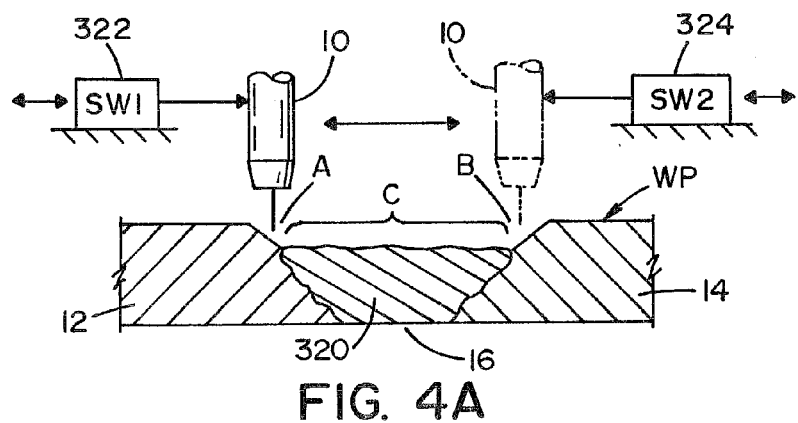
FIG. 4A is a cross-sectional view of a mechanized implementation of the invention for a fill pass in an open root operation as shown in FIG. 1.

The implementation of the invention illustrated in FIG. 3 is modified when the welder uses a mechanized weaving machine such as Spread Arc of The Lincoln Electric Company. In that type of welder, limit switches determine the extent of the length L of run or bead 20 in weave pattern P, as shown in FIG. 1C. When this type of welder and transfer mechanism is used to move torch 10 back and forth, the present invention is implemented as shown in FIG. 4. Controller program 300 includes section 202 which is identical to section 202 of FIG. 3. However, section 204 of FIG. 3 is replaced by a modified section 302 having a low power mode step 230 and a shortening routine 240, as shown in FIG. 3. Section 302 involves the use of limit switch to create the flag as identified by decision step 310. If the limit switch is off, step 310 does not have a created flag and logic on line 312 continues the low power of step 230. When the limit switch is tripped, decision step 310 creates a flag in line 314 to shift welder AW into the high heat weld mode of section 202 as described in FIG. 3. In the operation of program 300, the mechanical features schematically illustrated in FIG. 4A are employed. After a given amount of molten metal 320 is deposited by successive welding beads in the joint between plates 12, 14, spaced proximity or limit switches 322, 324 are adjusted to define the new center portion C and location of sections A and B. Thus, as torch 10 moves from limit switch 322 toward limit switch 324, there is no flag created for use in decision block 310. Thus, the low power 230 is maintained during movement along central portion C. When torch 10 reaches limit switch 324, a flag is created in decision block 310 to create a logic on line 314 to shift the electric arc welder into the high power or heat mode. This mode is illustrated as the high heat pulse transfer welding waveform of section 202. High heat is maintained until torch 10 reverses and moves back into portion C. Counter 220 is started. When the counter reaches the set count, program section 202 shifts the electric arc welder to the low power mode of section 302 for welding along center portion C. The same mechanical action operates decision mode 310 when torch 10 returns to limit switch 322. The torch moves back and forth along pattern P and has low heat in the center portion of the welding operation and high heat at both edges. In accordance with standard practice there may be a dwell at the edge to increase the amount of penetration and amount of metal melted and deposited at the two toes of bead 20.

The present invention is particularly applicable for use in robotic welders wherein the controllers of the welder and robot use advanced PLC technology. These controllers know the position of the torch at any given time. This type controller also has the ability of changing the weld process based upon a signal indicating a particular position of the torch in maneuvering through weave pattern P A typical installation for robotic applications includes a signal that sets a flag inside the welding controller, as indicated by controller program 400 shown in FIG. 5. This program has a high heat section 202*a*, generally similar to section 202 shown in FIGS. 3 and 4 with a modification of the decision step or block, in section 202*a*, decision step 410 looks for creation of a flag during each of the high frequency interrogations of computer program 400. If a flag does not exist, the electric arc welder maintains its operation with a high heat waveform in response to logic on line 412.

If a position has been reached where the high heat adjacent the edge should be terminated, a flag exists in block or decision step 410 to create a signal in line 414. This signal switches operation of program 400 into section 302*a* which is generally the same as program section 302 in FIG. 4 with the exception of the decision operation or step 420 which creates a logic on line 422 when there is no flag. If there is a flag indicating a given position has been reached in the robotic operation of welder AW, a logic appears on line 424 to shift the welding process from a low heat power mode to a high heat pulse transfer mode created by a waveform under the control of the waveform generator as schematically illustrated in FIG. 7.

Figure 5:
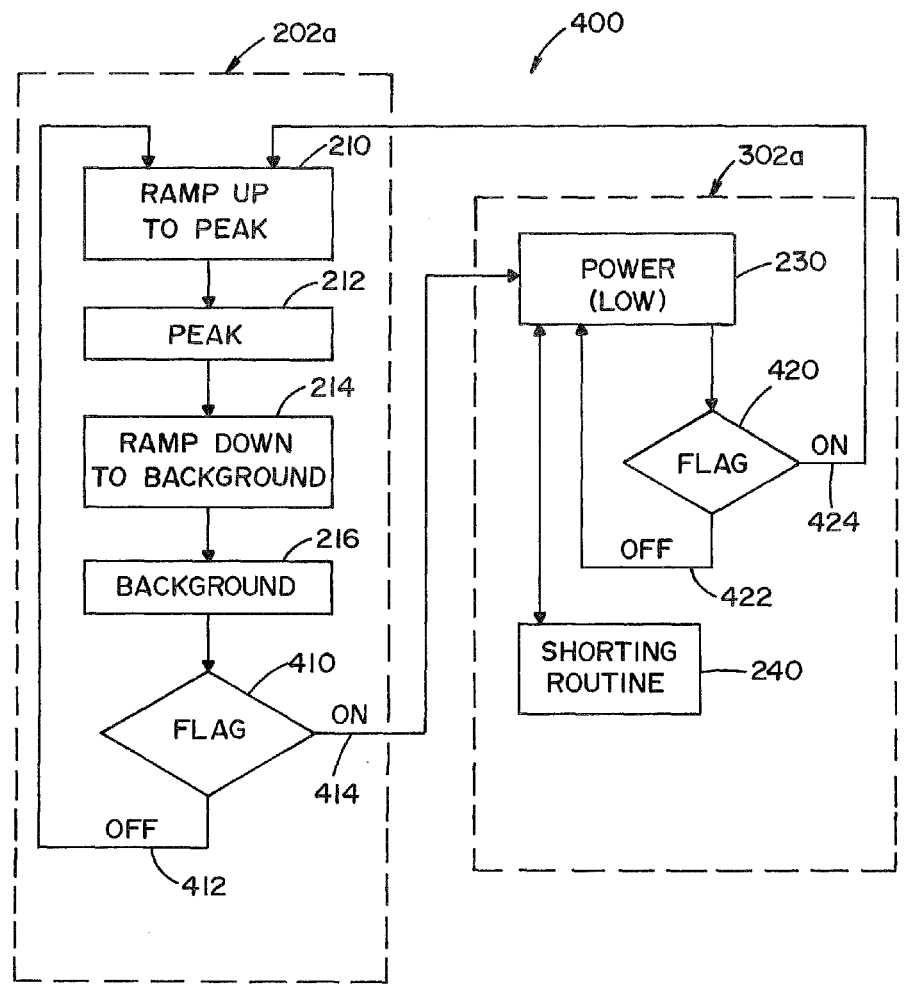
FIG. 5 is a block diagram and flow chart of a controller program for a robotic application of the welder constructed in accordance with the present invention.

FIGS. 3, 4 and 5 are schematic representations of programs used in a controller to process data to perform the present invention. Other programs can be developed for the same purpose.

A variety of mechanisms can be used to move torch C along the length L of weld bead 20. A representative illustration of such a mechanism is illustrated in FIG. 6 wherein travel device 500 in the form of a cylinder or motor 502 moves torch 10 transversely by arm 504. The whole mechanism is moved laterally in a direction perpendicular to the drawing by a device not shown. This compound movement forms weave pattern P illustrated in FIG. 1. As arm 504 moves torch 10 transversely, sensor element 506 coacts with markers 510, 512 to define the center portion C of bead ". Markers 510, 512 are associated with spaced outboard markers 520, 522 for determining the area during which high heat welding is employed. Markers 510, 512 and markers 520, 522 create signals in lines P1, P2, P3 and P4 as indicated. Movement of cylinder or motor 502 is governed by the operation of controller 530. Signals P2, P4 determine the extent of travel of arm 504 by cylinder or motor 502. Signals on lines P1-P4 also control the particular type of welding performed at any given time during movement of torch 10. Power source 540 is either operated by a low heat process indicated as control circuit 542 or a high heat process as indicated by control circuit 544. To actuate waveform control circuit 542 there is a device 550 which is actuated during the time between a signal in line P1 and a signal in line P3. This cycle X produces a logic on line 552 to actuate the low heat control circuit 542 for power source 540. The high heat control circuit 544 is operated by device 560 between either the signals in lines P1 and P2 or the signals in lines P3 and P4. This signal creates logic in line 562 that actuates the waveform of control circuit 544. Gate 570 is illustrated to indicate that either the high heat process is used or the low heat process. They can not be used simultaneously. Other mechanisms for moving torch 10 and providing signals to change the welding processes are within the skill of the art and the illustration in FIG. 6 is merely representative and illustrative.

A schematic representation of the electric arc welder preferred for use in practicing the present invention is illustrated in FIG. 7 wherein welder AW includes a power supply 600 connected to rectifier 610 with an output DC signal across lines 612, 614. Power factor correcting converter 620 changes the DC signal on lines 612, 614 into an output DC bus 622, 624 for driving high switching speed inverter 630 having output welding leads 632, 634. These leads create a welding process between advancing wire W acting as an electrode and workpiece WP. In accordance with standard practice, welding wire W is provided by the appropriate supply illustrated as reel 640 driven by motor 642 in accordance with the output of microprocessor 644 having a wire feed speed adjusted by circuit 646. The wire feed speed is set by circuit 646 to a given WFS during the welding processes employed along weld bead 20. In accordance with common practice, shunt 650 creates an arc current signal at device 652 so a voltage representing the real time arc current appears in output line 652a. In a like manner, device 654 creates an arc voltage signal in line 654a. The output waveform of inverter 630 is determined by pulse width modulator 660 operated at high frequency greater than about 20 kHz by oscillator 662. The digital input represented by line 664 controls digital pulse width modulator 660 to create an instantaneous digital signal on line 666 to control the profile of the waveform in the process being implemented between wire W and workpiece WP. To adjust the digital signal on line 664 there is a digital analog amplifier 670 having a first input 672, which is to be followed, and a feedback input 652a indicating the actual current of welder AW. To create the desired profile signal on line 672, a standard waveform generator 680 is employed. A state table, indicative of the waveform of a given weld process, is loaded into waveform generator 680 from state table memory indicated as blocks 682. The particular table loaded into waveform generator 680 is determined by selector 684 movable between a first process, as indicated by block 686, and a second process indicated by block 688. Thus, selector 684 shifts between the two set weld programs, which programs are schematically illustrated as programs 202, 202a, 204, 302 and 302a. Thus, the present invention performs a welding operation using either one of two welding processes according to which of the tables are loaded into waveform generator 680. In accordance with normal practice, the voltage signal on line 654a is read by a detector routine 690 to detect a short circuit. A short circuit changes the signal in line 692 for the purpose of shifting the waveform generator into a short clearing routine.

In accordance with the invention, the waveform or power setting for the different welding processes may have different polarities. This is determined by the selected waveform from the tables of block 682. The table for a given waveform creates a signal in line 694 to control the polarity of the waveform across leads 632, 634 by actuation of an internal polarity circuit 696 setting an output signal at line 698 to set the desired polarity of the waveform. In accordance with the preferred embodiment of the invention, the controller for welder AW is digital even though it is represented as somewhat analog in the representations of FIG. 7. This waveform generator type control system is used in practicing the present invention and is a feature of the invention but not a limitation to the invention.

Figure 8:
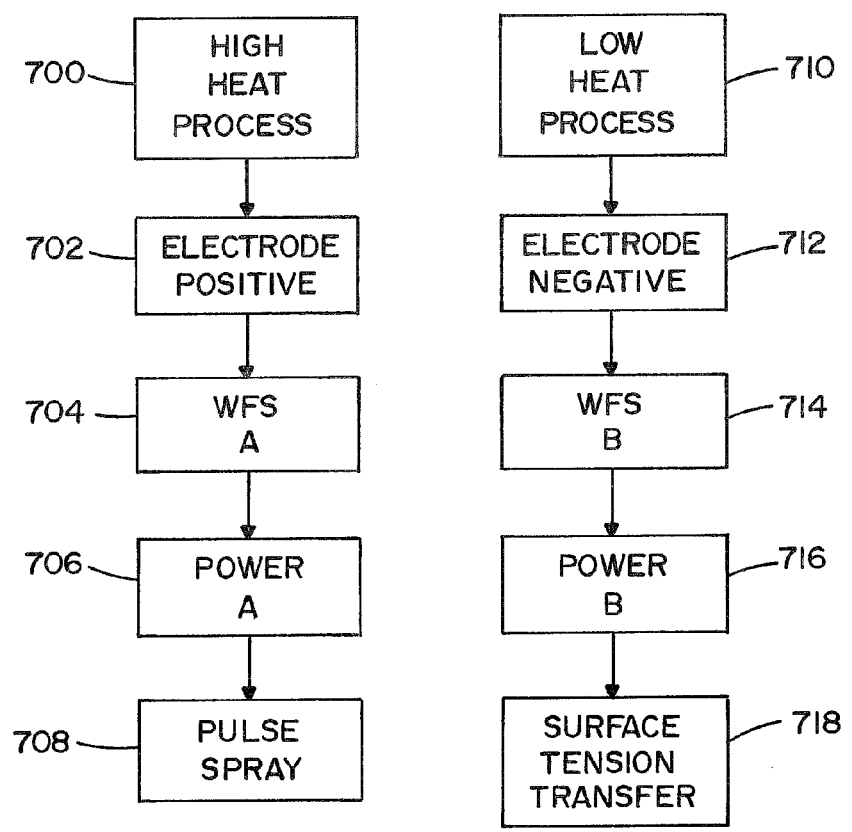
FIG. 8 is a flow chart illustrating constituents employed in the first and second weld process of the welder and method performing the present invention; and, FIGS. 9-15 are block diagrams illustrating control elements for synchronizing the movement of the welder with the two weld processes to be performed when practicing the present invention.

The invention involves using low heat and high heat welding processes in a given bead of a weave pattern for welding. Each bead has a short length, generally less than 2.0 inches. A high heat process and a low heat process includes several constituents, as schematically illustrated in FIG. 8. The high heat process 700 involves a given polarity, such as positive polarity 702, a wire feed speed such as wire feed speed 704, a power level 706 and a mode of welding 708. Consequently, the term "welding process" or "weld process" involves a lot of features other than merely the type of waveform used in the process. By changing the polarity, the wire feed speed and/or the power level, the amount of high heat welding at the ends of the weld bead is controlled. In a like manner, the low heat process 710 includes an electrode polarity 712, a wire feed speed 714, a power level 716 and a mode of welding indicated as surface tension transfer 718. FIG. 8 is presented as a disclosure of the meaning of the term "weld process" which designates more than just the type or mode of welding.

Figure 9:
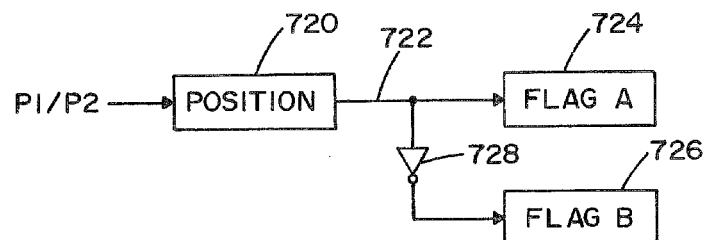
Figure 10:
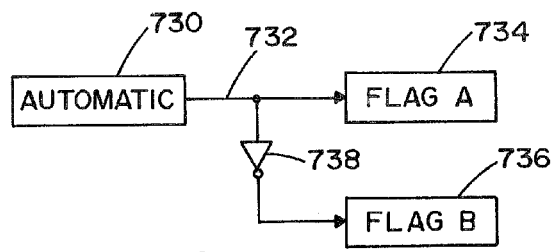
Figure 12:
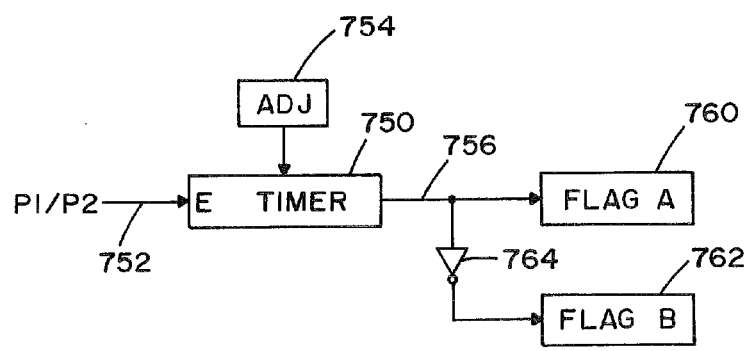

FIGS. 9-15 are various schemes or techniques for synchronizing the weld process with the position of torch 10. They are representative in nature and other arrangements can be used for such synchronization. In FIG. 9, the scheme for developing two flags as mentioned in FIG. 7 involves a sensor 720 having a logic output 722. This output creates either a flag 724 for the first weld process or a flag 726 for the second weld process. In this manner, flags are created according to the position as read by markers creating a signal, such as the signals in line P1, P2, The weld process shifting flags can also be generated automatically by a robotic device illustrated as block 730 having an output logic 732 for creating a first flag 734 or a second flag 736. Anti-coincidence gate 728 of FIG. 9 is also illustrated as gate 738 in FIG. 10. In this manner, only one of the flags is created at any given time.

Figure 11:
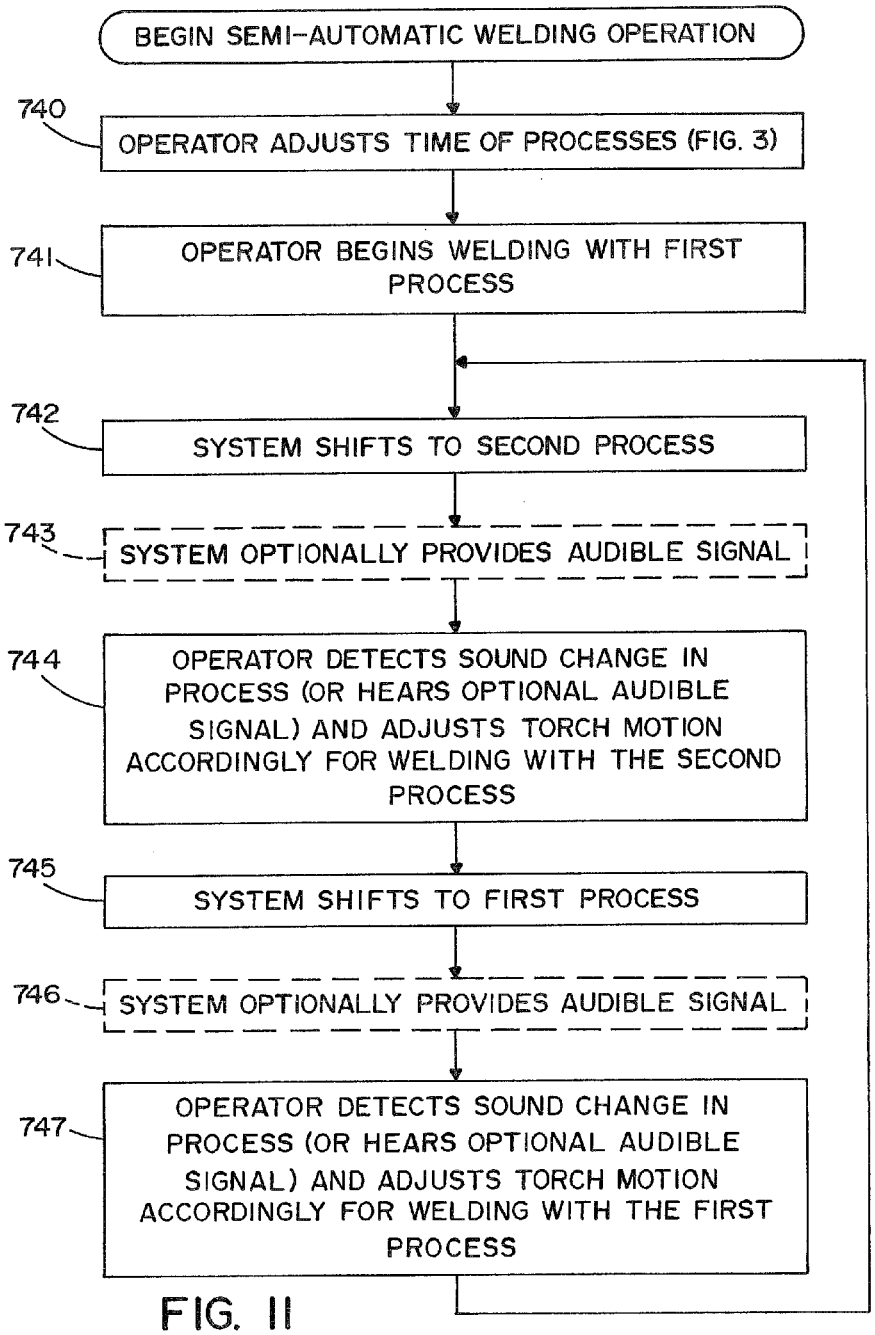
Figure 13:
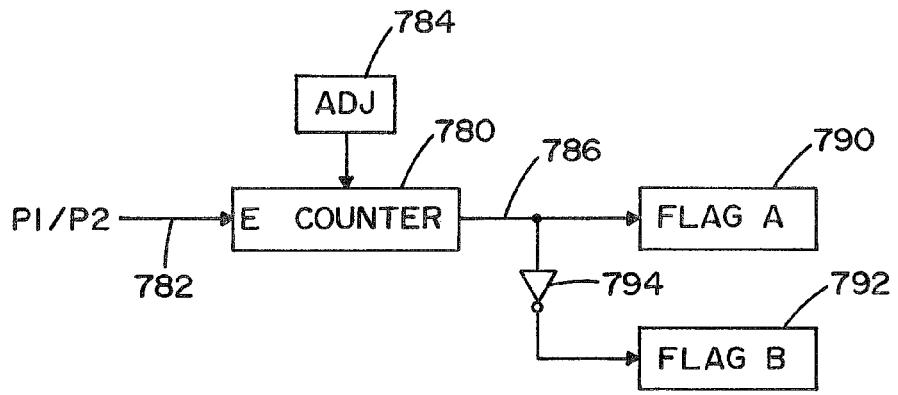
Figure 14:
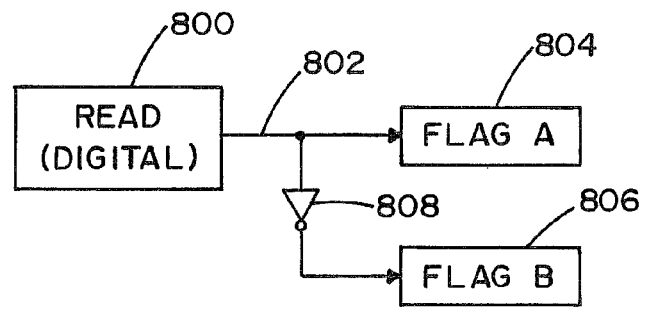

In accordance with another aspect of the invention, the semi-automatic implementation of the present invention as illustrated in FIG. 3 allows the operator to adjust the time of processes. The flow diagram of FIG. 11 illustrates an example of semi-automatic operation, in which the operator adjusts the time of the processes at 740 (e.g., FIG. 3 above) and begins welding at 741 including shifting the torch 10 along the bead 20 using a first welding process, for instance, beginning at one of the edges of the weld. At 742, the system shifts to the second weld process, and may optionally provide an audible signal to the operator at 743. The operator at 744 detects either an inherent sound change in the process, or hears the optional system-generated audible signal associated with the change in the weld process, and uses the signal to adjust the torch motion accordingly, for instance, to control the rate of travel across center portion C and the dwell time in areas A and B for the second process. At 745, the system shifts to the first process and may optionally provide another audible signal at 746. At 747, the operator detects the process switch either by the sound change in the process itself or by the system-generated audible signal, and adjusts the torch motion accordingly, after which the process returns to 742 as described above.

Figure 15:
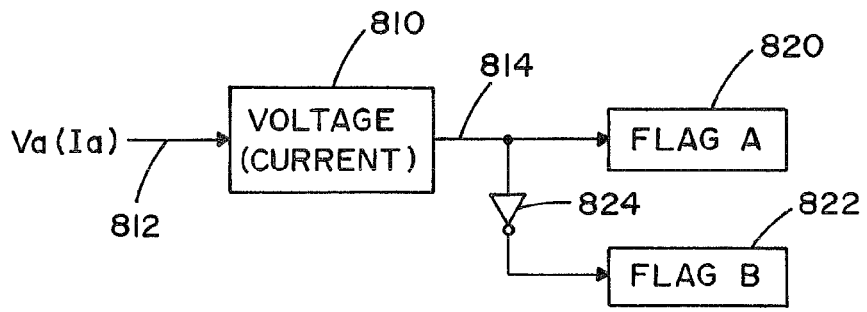

As described in FIG. 3, an adjustable timer is used to shift between the two weld processes. This concept is illustrated schematically in FIG. 12 wherein timer 750 is adjustable as indicated by block 754. A start or enable signal on line 752 causes timer 750 to output a logic on line 756 when the timer reaches the adjusted set time. This logic activates a flag 760 or a flag 762 according to the logic on line 756. The anti-coincidence gate 764 allows the flags to be operated in accordance with the logic on line 756. Timer 750 can be replaced by counter 780 shown in FIG. 13 wherein the counter is reset by the logic on line 782. The count is adjusted as indicated by block 784 so that the logic on line 786 determines whether flag 790 or flag 792 is activated to select the desired weld process at any given time during movement of torch 10. A program signal indicated by block 800 in FIG. 14 can also be used to generate the logic on line 802 to select either flag 804 or flag 806. As shown in FIG. 15, the arc current or arc voltage signal on line 812 can be used to control program 810 for creating a logic on line 814 according to the arc current or arc voltage indicative of the position of torch 10. Gates 808 and 824 are for the purpose as previously described. The schemes or techniques schematically illustrated in FIGS. 9-15 can be used to alternate between one welding process and the other welding process to implement the present invention.

The invention claimed is:

1. An electric arc welder for producing a weave pattern across a workpiece with a succession of individual weld runs substantially transverse to a weld seam, each run having a center portion extending between two transversely spaced edges, the welder comprising:
    a power source;
    a wire feeder; and
    a controller for causing the power source to perform a first weld process in the center portion and a second weld process adjacent at least a first one of the edges, the controller including a waveform generator for generating one of a first waveform or a second waveform, the one of the first waveform or the second waveform being operative to cause the power source to perform the first weld process or the second weld process, respectively, wherein the second weld process is a different process than the first weld process.

2. An electric arc welder as defined in claim 1 wherein the controller performs the second weld process adjacent both of the edges.

3. An electric arc welder as defined in claim 1 wherein the controller performs the second weld process adjacent a second one of the edges.

4. An electric arc welder as defined in claim 2 wherein the first weld process is a lower heat process than the second weld process.

5. An electric arc welder as defined in claim 1, wherein the first weld process is selected from the group consisting of short arc transfer GMAW, surface tension transfer, low power mode, low WFS, negative polarity shorting transfer, low duty cycle VP-GMAW and CMT transfer and the second weld process is selected from the class consisting of spray transfer GMAW, pulsed spray transfer, high power mode, high WFS, positive polarity pulse and high duty cycle VP-GMAW.

6. An electric arc welder as defined in claim 1 wherein the controller includes software to create a flag wherein the welder is to transition from one of the first and second weld processes to the other of the first and second weld processes upon creation of the program flag.

7. An electric arc welder as defined in claim 6 wherein the software creates the flag based upon a timer, a counter, a position switch, a sensed arc voltage, arc current and/or power, or combinations thereof.

8. An electric arc welder as defined in claim 1 wherein the first weld process includes control of the power source and control of the wire feed speed of the wire feeder of the welder.

9. An electric arc welder as defined in claim 1 wherein the second weld process includes control of the power source and control of the wire feed speed of the wire feeder of the welder.

10. An electric arc welder as defined in claim 1 wherein the power source is an inverter operated by a pulse width modulator, with a control input, for creating high frequency pulses with a width or duty cycle to control output current and/or voltage of the power source based upon the signal on the control input.

11. An electric arc welder as defined in claim 10, further comprising a digital circuit for comparing the one of the first waveform or the second waveform with the arc current or voltage of the power source to create a waveform profile signal driving the control input of the pulse width modulator.

12. An electric arc welder as defined in claim 1 wherein the workpiece is an open root between spaced plates and the center portion spans the open root and the edges are on the plates.

13. An electric arc welder as defined in claim 1 wherein the first weld process is a surface tension transfer process.

14. An electric arc welder as defined in claim 1 wherein the second weld process is a spray or pulse transfer process.

15. An electric arc welder as defined in claim 1 wherein the first weld process is electrode negative.

16. An electric arc welder as defined in claim 1 wherein the second weld process is electrode positive.

17. An electric arc welder for producing a weave pattern across a workpiece with a succession of individual weld runs substantially transverse to a weld seam, each run having a center portion extending between two transversely spaced edges, the welder comprising:
    a power source;
    a wire feeder to direct a welding wire through a movable torch to the workpiece;
    a controller for creating a welding current between the wire and the workpiece; and
    a mechanical device for moving the torch along the weave pattern;
    wherein the controller has a program to perform a first weld process while the torch is moving along the center portion and a second weld process when the torch is adjacent the edges; and
    wherein the first weld process has less heat input than the second weld process, wherein the second weld process is a different process than the first weld process and wherein the first weld process is selected from the group consisting of short arc transfer GMAW, surface tension transfer, low power mode, low WFS, negative polarity shorting transfer, low duty cycle VP-GMAW and CMT transfer.

18. An electric arc welder for producing a weave pattern across a workpiece with a succession of individual weld runs substantially transverse to a weld seam, each run having a center portion extending between first and second edges transversely spaced from one another, the welder comprising:
    a power source operative to create a welding current between a workpiece and a welding wire moving through a torch toward the workpiece;
    a wire feeder operative to advance the welding wire toward the workpiece; and
    a controller operative to cause the power source to perform a first weld process in the center portion and a second weld process adjacent at least one of the edges, the controller including a waveform generator for generating one of a first waveform or a second waveform, the one of the first waveform or the second waveform being operative to cause the power source to perform the first weld process or the second weld process, respectively, wherein the first weld process is a different process than the second weld process and wherein the first weld process is selected from the group consisting of short arc transfer GMAW, surface tension transfer, low power mode, low WFS, negative polarity shorting transfer, low duty cycle VP-GMAW and CMT transfer.

19. An electric arc welder as defined in claim 18 wherein the second weld process is selected from the class consisting of spray transfer GMAW, pulsed spray transfer, high power mode, high WFS, positive polarity pulse and high duty cycle VP-GMAW.

20. An electric arc welder as defined in claim 18 wherein the first weld process is electrode negative, and wherein the second weld process is electrode positive.

21. An electric arc welder as defined in claim 18 wherein the controller performs the second weld process adjacent both of the edges.

* * * * *